(12) United States Patent
Waggoner et al.

(10) Patent No.: US 6,919,127 B2
(45) Date of Patent: Jul. 19, 2005

(54) SILICON CARBIDE COMPOSITES, AND METHODS FOR MAKING SAME

(75) Inventors: W. Michael Waggoner, Newark, DE (US); Barry R. Rossing, Newark, DE (US); Michael A. Richmond, Newark, DE (US); Michael K. Aghajanian, Newark, DE (US); Allyn L. McCormick, Oxford, PA (US)

(73) Assignee: M Cubed Technologies, Inc., Monroe, CT (US)

( * ) Notice: Subject to any disclaimer, the term of this patent is extended or adjusted under 35 U.S.C. 154(b) by 0 days.

(21) Appl. No.: 10/336,626

(22) Filed: Jan. 3, 2003

(65) Prior Publication Data

US 2003/0180579 A1 Sep. 25, 2003

Related U.S. Application Data

(62) Division of application No. 09/621,562, filed on Jul. 21, 2000, now Pat. No. 6,503,572.
(60) Provisional application No. 60/145,299, filed on Jul. 23, 1999.

(51) Int. Cl.[7] .............................. B32B 9/00; B32B 15/02
(52) U.S. Cl. .................... 428/325; 428/294.4; 428/446; 428/469; 428/698
(58) Field of Search ................................ 428/698, 469, 428/323, 325, 294.4, 296; 420/528, 548, 469, 590, 513, 587, 490

(56) References Cited

U.S. PATENT DOCUMENTS

| | | |
|---|---|---|
| 3,205,043 A | 9/1965 | Taylor |
| 3,246,275 A | 4/1966 | Schrewelius |
| 3,275,722 A | 9/1966 | Popper |
| 3,495,939 A | 2/1970 | Forrest |
| 3,725,015 A | 4/1973 | Weaver |
| 4,174,971 A | 11/1979 | Schrewelius |
| 4,184,894 A | 1/1980 | Hillig et al. |

(Continued)

FOREIGN PATENT DOCUMENTS

| | | |
|---|---|---|
| DE | 197 11 831 A1 | 9/1998 |
| EP | 0 798 280 A2 | 10/1997 |

OTHER PUBLICATIONS

J.S. Haggerty and Y.—M. Chaing, "Reaction–Based Processing Methods for Ceramics and Composites", *Ceram. Eng. Sci. Proc.*, 11[7–8] pp. 757 and 760–781 (1990).

Leszek Hozer et al., "Reactive–infiltration processing of SiC–metal and SiC–intermetallic composites", *Journal of Materials Research*, vol. 11, No. 9, Sep. 1996, pp. 2346–2357.

Leszek Hozer et al., "Phase Composition Control in SiC Composites Prepared by Reactive–Infiltration with Metal–Silicon Alloys", in *Advanced Synthesis and Processing of Composites and Advanced Ceramics, Ceramic Trans.*, v56, American Ceramic Society, Inc., 1995, pp. 157–165.

*Primary Examiner*—Stephen Stein
(74) *Attorney, Agent, or Firm*—Law Office of Joffrey R. Ramberg

(57) ABSTRACT

Improved silicon carbide composites made by an infiltration process feature a metal phase in addition to any residual silicon phase. Not only are properties such as mechanical toughness improved, but the infiltrant can be so engineered as to have much diminished amounts of expansion upon solidification, thereby enhancing net-shape-making capabilities. Further, multi-component infiltrant materials may have a lower liquidus temperature than pure silicon, thereby providing the practitioner greater control over the infiltration process. In particular, the infiltration may be conducted at the lower temperatures, where low-cost but effective bedding or barrier materials can terminate the infiltration process once the infiltrant has migrated through the permeable mass up to the boundary between the mass and the bedding material.

22 Claims, 1 Drawing Sheet

U.S. PATENT DOCUMENTS

| | | | |
|---|---|---|---|
| 4,336,075 A | * 6/1982 | Quist et al. | 148/550 |
| 4,600,481 A | 7/1986 | Sane et al. | |
| 4,643,543 A | * 2/1987 | Mohn et al. | 359/846 |
| 4,735,923 A | 4/1988 | Sugarowa et al. | |
| 5,006,417 A | 4/1991 | Jackson | |
| 5,079,195 A | 1/1992 | Chaing et al. | |
| 5,125,822 A | 6/1992 | Kasprzyk | |
| 5,167,920 A | * 12/1992 | Skibo et al. | 420/548 |
| 5,205,970 A | 4/1993 | Brun et al. | |
| 5,316,851 A | * 5/1994 | Brun et al. | 428/379 |
| 5,382,456 A | 1/1995 | Hocking et al. | |
| 5,395,701 A | * 3/1995 | White et al. | 428/614 |
| 5,464,583 A | 11/1995 | Lessing | |
| 5,509,555 A | 4/1996 | Chaing et al. | |
| 5,523,050 A | * 6/1996 | Lloyd et al. | 420/528 |
| 5,620,804 A | 4/1997 | Kennedy et al. | |
| 5,626,692 A | * 5/1997 | Rohatgi et al. | 148/538 |
| 5,865,922 A | 2/1999 | Behrendt et al. | |
| 5,945,166 A | 8/1999 | Singh et al. | |
| 6,183,874 B1 | * 2/2001 | Yamagata et al. | 428/472 |
| 6,503,572 B1 | * 1/2003 | Waggoner et al. | 427/431 |

* cited by examiner

SILICON CARBIDE COMPOSITES, AND METHODS FOR MAKING SAME

This patent publication is a Divisional of U.S. patent application Ser. No. 09/621,562, now U.S. Pat. No. 6,503,572, filed on Jul. 21, 2000, which claimed the benefit of provisional U.S. Patent Application Ser. No. 60/145,299, filed on Jul. 23, 1999.

TECHNICAL FIELD

The present invention relates to improved composite materials and the melt infiltration methods for producing the same. Specifically, the present invention relates to silicon carbide composites wherein preferably at least a portion of the silicon carbide is produced by reactive infiltration.

BACKGROUND ART

Silicon carbide composites have been produced by reactive infiltration techniques for more than thirty-five years. In general, such a reactive infiltration process comprises contacting molten silicon with a porous mass containing silicon carbide plus carbon in a vacuum or an inert atmosphere environment. A wetting condition is created, with the result that the molten silicon is pulled by capillary action into the mass, where it reacts with the carbon to form additional silicon carbide. This in-situ silicon carbide typically is interconnected. A dense body usually is desired, so the process typically occurs in the presence of excess silicon. The resulting composite body thus comprises silicon carbide and unreacted silicon (which also is interconnected), and may be referred to in shorthand notation as Si/SiC. The process used to produce such composite bodies is interchangeably referred to as "reaction forming", "reaction bonding" or "reactive infiltration".

In one of the earliest demonstrations of this technology, Popper (U.S. Pat. No. 3,275,722) produced a self-bonded silicon carbide body by infiltrating silicon into a porous mass of silicon carbide particulates and powdered graphite in vacuo at a temperature in the range of 1800 to 2300 C.

Taylor (U.S. Pat. No. 3,205,043) also produced dense silicon carbide bodies by reactively infiltrating silicon into a porous body containing silicon carbide and free carbon. Unlike Popper, Taylor first made a preform consisting essentially of granular silicon carbide, and then he introduced a controlled amount of carbon into the shaped mass. In one embodiment of his invention, Taylor added the carbon in the form of a carbonizable resin, and then heated the mass containing the silicon carbide and infiltrated resin to decompose (carbonize) the resin. The shaped mass was then heated to a temperature of at least 2000 C. in the presence of silicon to cause the silicon to enter the pores of the shaped mass and react with the introduced carbon to form silicon carbide.

Hillig and his colleagues at the General Electric Company took a different approach, where fibrous versions of Si/SiC composites were produced by reactively infiltrating carbon fiber preforms.

More recently, Chiang et al. (U.S. Pat. No. 5,509,555) discloses the production of silicon carbide composite bodies through the use of a silicon alloy infiltrant. The preform to be infiltrated by the alloy can consist of carbon or can consist essentially of carbon combined with at least one other material such as a metal like Mo, W, or Nb; a carbide like SiC, TiC, or ZrC; a nitride like $Si_3N_4$, TiN or AlN; an oxide like $ZrO_2$ or $Al_2O_3$; or an intermetallic compound like $MoSi_2$ or $WSi_2$, or mixtures thereof. The liquid infiltrant includes silicon and a metal such as aluminum, copper, zinc, nickel, cobalt, iron, manganese, chromium, titanium, silver, gold, platinum and mixtures thereof.

In a preferred embodiment of the Chiang et al. invention, the preform can be a porous carbon preform, the liquid infiltrant alloy can be a silicon-aluminum alloy containing in the range of from about 90 at % to about 40 at % silicon and in the range of from about 10 at % to about 60 at % aluminum and the carbon preform can be contacted with the silicon-aluminum alloy at a temperature in the range of from about 900 C. to about 1800 C. for a time sufficient so that at least some of the porous carbon is reacted to form silicon carbide. Upon cooling, the dense composite formed thereby can be characterized by a phase assemblage comprising silicon carbide and at least one phase such as silicon-aluminum alloy, a mixture of silicon and aluminum, substantially pure aluminum or mixtures thereof.

One problem with infiltrating multi-constituent liquids into preforms containing large fractions of carbon is that the infiltrant chemistry can change dramatically over the course of infiltration, as well as from one location to another within the preform. Table 3 of Chiang et al. demonstrates this point. There, the infiltrant started out as being about 54 at % Si, 46 at % Cu, but after infiltration into a carbon preform, it was substantially 100% Cu. Such drastic compositional changes can make processing difficult; this same Table revealed that when the infiltrant alloy started out at about 30 at % Si, 70 at % Cu, pressure was required to achieve infiltration. Pressure infiltrations require much more complex and expensive equipment than do pressureless infiltration techniques, and usually are more limited in the size and shape of the parts that can be produced thereby. Thus, while the present invention is not limited to pressureless systems, unless otherwise noted, the infiltrations of the present invention refer to those not requiring the application of pressure.

Chiang et al. state that their method allows production of composites very near net-shape without a need for additional machining steps. They describe a number of non-machining techniques for removing the residual, unreacted liquid infiltrant alloy remaining on the reacted preform surface. Specifically, Chiang et al. state that following infiltration, the composite body may be heated to a temperature sufficient to vaporize or volatilize the excess liquid alloy on the surface. Alternatively, the reacted preform may be immersed in an etchant in which the excess unreacted liquid infiltrant is dissolved while the reacted preform is left intact. Still further, the reacted preform may be contacted with a powder that is chemically reactive with the unreacted liquid infiltrant alloy such as carbon, or a metal like Ti, Zr, Mo or W.

In U.S. Pat. No. 5,205,970, Milivoj Brun et al. also are concerned with removing excess infiltrant following production of silicon carbide bodies by an infiltration process. Specifically, Brun et al. contact the reaction formed body with an infiltrant "wicking means" such as carbon felt. More generally, the wicking means may comprise porous bodies of infiltrant wettable materials that are solid at the temperature at which the infiltrant is molten. Preferably, the wicking means has capillaries that are at least as large or larger than the capillaries remaining in the reaction formed body. Thus, infiltrant in the reaction formed body that is filling porosity remains in the reaction formed body instead of being drawn into the wicking means and leaving porosity in the reaction formed body.

The "wicking means" solution of Brun et al. to the problem of removing excess adhered silicon, while perhaps effective, nevertheless requires the additional processing steps of contacting the formed composite body with the wicking means and re-heating to above the liquidus temperature. What is needed is a means for eliminating or at least minimizing the degree of residual infiltrant adhered to the formed silicon carbide composite body.

It is an object of the present invention to produce a silicon carbide composite body to near-net shape, thereby minimizing the amount of grinding and/or machining necessary to achieve the required dimensions of the finished article.

It is an object of the present invention to produce a silicon carbide composite body of improved toughness.

It is an object of the present invention to produce a silicon carbide composite body of increased thermal conductivity.

It is an object of the present invention to produce a silicon carbide composite body whose thermal expansion coefficient is above that of silicon carbide, and tailorable.

It is an object of the present invention to produce a silicon carbide composite body at temperatures that are above, but only modestly above, the liquidus temperature of the silicon-bearing infiltrant material.

It is an object of the present invention to produce a silicon carbide composite body at a temperature that is substantially less than the melting point of pure silicon.

It is an object of the present invention to produce a silicon carbide composite body without having to resort to boron-containing barrier materials or expensive molds to control the extent of infiltration.

DISCLOSURE OF THE INVENTION

These objects and other desirable attributes of the present invention are accomplished through careful control of a number of the processing conditions employed in making composite bodies by reactive infiltration. In terms of the present invention, the most important of these processing conditions is infiltrant chemistry. Specifically in accordance with the present invention, the infiltrant material comprises at least two constituents, and at least one of the constituents comprises silicon.

It has been noted that silicon undergoes a net volume expansion of about 9 percent upon solidification. Thus, in accordance with one aspect of the present invention, by alloying the silicon with a material that undergoes a net volume shrinkage upon solidification, it is possible to produce a silicon carbide composite body having a residual infiltrant component that undergoes substantially no net volume change upon solidification. Thus, production of silicon carbide composite bodies that exhibit neither solidification porosity nor solidification exuding of the infiltrant component can be realized.

Carbon is frequently added to the permeable mass to enhance infiltration. (Unless otherwise noted, from hereon the term "permeable mass" will be understood to include the term "preform".) One ramification of such alloying, however, is the change that takes place in the chemical composition of the infiltrant as it infiltrates the permeable mass or preform and as the silicon constituent of the infiltrant alloy reacts with the carbon contained therein to produce silicon carbide. Accordingly, the present inventors have discovered the significance and importance of keeping the carbon content of the permeable mass to be infiltrated at relatively low levels. Preferably, the amount of free carbon in the permeable mass is kept as low as necessary to accomplish complete infiltration in a reliable manner but without unduly compromising the binder qualities of the carbon when preforms (e.g., self-supporting permeable masses) are used. This way, large bodies can be infiltrated with minimal changes in the infiltrant alloy composition, thereby resulting in a silicon carbide composite body having a dispersed alloy phase of relatively uniform composition throughout the body.

The use of a multi-constituent infiltrant composition has additional advantages beyond the ability to produce composite bodies whose alloy component has zero or near-zero volumetric change (swelling or contraction) upon solidification.

For instance, and in another major aspect of the present invention, the alloying of silicon infiltrant with one or more different elemental constituents can substantially depress the melting point of the infiltrant. Desirable alloying elements in this regard include aluminum, beryllium, copper, cobalt, iron, manganese, nickel, tin, zinc, silver and gold. The lowered melting or liquidus temperatures permit the infiltration to be conducted at lower temperatures. For example, when the infiltrant comprises a silicon-aluminum alloy, it is possible to infiltrate a porous mass comprising some elemental carbon at a temperature in the range of about 1100 to about 1300 C. By way of comparison, when the infiltrant consists essentially of silicon, the temperature must be maintained at least above the silicon melting point of about 1412 C., and often substantially above the melting point so that the melt is sufficiently fluid. One of the most important consequences of being able to operate at lower temperatures is the discovery that at the lower temperatures, the infiltration is more reliably terminated at the boundaries of the permeable mass. Further, instead of having to use expensive graphite molds to support the permeable mass and to confine the liquid infiltrant, cheaper materials such as a loose mass of ceramic particulate may be used. Thus, the ability to conduct infiltrations at lower temperatures gives operators more control over the process, not to mention saving time and energy.

BEST MODES FOR CARRYING OUT THE INVENTION

Figure 1A:
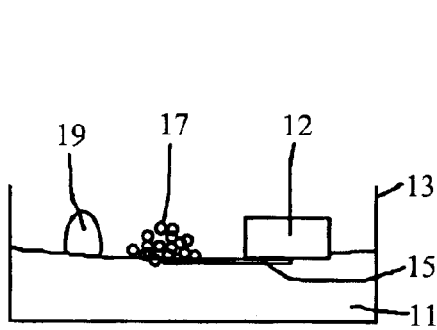
FIGS. 1A and 1B are side and top schematic views, respectively, of an arrangement of materials used to produce a silicon carbide composite "U-channel" in accordance with Example 4.

According to the methods of the present invention, a permeable mass containing at least some carbon is infiltrated with a molten, multi-constituent alloy comprising silicon. At least at some point during the infiltration, the silicon component of the infiltrant alloy chemically reacts with at least a portion of the carbon in the permeable mass to form silicon carbide. Although possibly modified somewhat compositionally, typically some alloy material remains in the infiltrated body, and distributed throughout. The body thus formed containing in-situ silicon carbide and residual alloy is therefore a composite body.

If the starting amount of silicon alloy is insufficient to fill the interstices of the permeable mass, at least some of the residual, unreacted alloy in the body may be distributed as discrete, isolated pockets. Usually an excess of infiltrant material is supplied to the permeable mass, and the residual alloy in the composite body is interconnected The present invention encompasses placing one, several or all of the constituents of the multi-component infiltrant within the permeable mass to be infiltrated, or at an interface between the mass and an adjacent body of the infiltrant material. Preferably though, the constituents of the infiltrant material are provided as an alloy, possibly in ingot or other bulk form, that is then brought into contact with the permeable mass to be infiltrated. The infiltrant material may be placed into direct contact with the permeable mass to be infiltrated, or the infiltrant material may remain substantially isolated from the permeable mass, with a wicking means interposed between the two to create a pathway or conduit for the molten infiltrant material to migrate toward and into the permeable mass. The wicking means could be most any material that is wet by molten infiltrant material, with silicon carbide being preferred.

The present invention contemplates producing in-situ silicon carbide. Accordingly, at least one constituent of the multi-constituent infiltrant material comprises silicon. The other constituent(s) may be any that are capable of producing some desirable effect during processing or on the final character or properties of the resulting composite body. For example, the non-silicon constituent(s) may give rise to an alloy having a lower liquidus temperature than the melting point of pure silicon. A reduced liquidus temperature might then permit the infiltration to be conducted at a lower temperature, thereby saving energy and time, as well as reducing the tendency for the infiltrant to over-infiltrate the boundaries of the preform or permeable mass into the supporting materials. A non-silicon constituent infiltrated into the permeable mass along with the reactive silicon constituent may produce superior properties of the resulting composite body—enhanced strength or toughness, for instance. A non-silicon constituent so infiltrated may also counterbalance the expansion of the silicon phase upon solidification, a desirable result from a number of standpoints, as will be discussed in more detail later. Elemental non-silicon constituents that fulfill one or more of the advantageous attributes include aluminum, beryllium, copper, cobalt, iron, manganese, nickel, tin, zinc, silver, gold, boron, magnesium, calcium, barium, strontium, germanium, lead, titanium, vanadium, molybdenum, chromium, yttrium and zirconium. Preferred constituents include aluminum, copper, iron, nickel, cobalt and titanium. Particularly preferred are aluminum and copper.

One such alloying element that has been identified as fulfilling all three desirable attributes is aluminum. The present inventors have observed that a silicon carbide composite body that also contains some aluminum phase is substantially tougher than a silicon carbide composite containing residual, unreacted silicon. Still further, the present inventors have discovered that when the residual infiltrant component of the composite body comprises about 40 to 60 percent by weight silicon and 60 to 40 percent aluminum, the volume change of the residual infiltrant phase is practically zero. In a particularly preferred embodiment, a preform comprising silicon carbide particulate and about one to several percent by weight of carbon may be readily infiltrated in a rough vacuum at about 1100 C. with an infiltrant alloy comprising roughly equal weight fractions of silicon and aluminum to produce a composite body comprising silicon carbide plus residual alloy having a composition of about 40 to 45 percent by weight silicon, balance aluminum. In addition, the present inventors have discovered that at this lower infiltration temperature of about 1100C., a loose mass of silicon carbide particulate can be used to support the permeable mass or preform to be infiltrated without itself being infiltrated by the molten infiltrant. This discovery greatly simplifies the furnacing operation and obviates the need for expensive graphite fixturing and tooling.

In general, the temperature at which the infiltration is conducted is the lowest at which infiltration occurs quickly and reliably. Also, in general, the higher the temperature, the more robust is the infiltration. Unnecessarily high infiltration temperatures are not only wasteful in terms of energy costs and the extra heating and cooling time required, but the more likely it is that undesired reactions can occur. A number of ceramic materials that are usually thought of as being inert and uninfiltratable at moderate temperatures (e.g., aluminum oxide, boron nitride, silicon nitride) can lose their inert character or are infiltrated by silicon at elevated temperatures (e.g., about 1500 C. and above), particularly under vacuum. Thus, it becomes quite a challenge to house or support a permeable mass to be infiltrated and to minimize the degree of over-infiltration into the supporting material, or reaction therewith. Such over-infiltration typically results in the over-infiltrated material being bonded to the infiltrated mass, necessitating costly grinding or diamond machining for its removal. Another problem with unnecessarily excessive infiltration temperatures is that the non-silicon constituent(s) may have a higher vapor pressure than the silicon component, with the undesirable result that such constituent is readily volatilized out of the infiltrant alloy, changing the alloy chemistry and contaminating the furnace.

The atmosphere in which the infiltration of a silicon-containing alloy is conducted is usually one that is inert or mildly reducing. Accordingly, argon, helium, forming gas and carbon monoxide may be used. A vacuum environment is preferred, however, at least from the standpoint of facilitating the reliability or robustness of infiltration.

Of course, the mass or preform to be infiltrated by the silicon-containing infiltrant must be one that is permeable to the infiltrant under the local processing conditions. Given sufficient temperature, e.g., about 2150 C., pure silicon carbide can be infiltrated by silicon in a pressureless manner (see for example, U.S. Pat. No. 3,951,587 to Alliegro et al.), but more typically, the permeable mass contains some elemental or free carbon to facilitate the process. The more carbon that is present, the more silicon carbide that is produced in-situ. While it is possible to reactively infiltrate a permeable mass containing large amounts of carbon, such is generally undesirable in the context of the present invention because the infiltrant alloy will change too much from one zone in the preform to the next. Large compositional changes are usually undesirable for at least two reasons: First, the altered alloy composition may be such that it no longer wets the permeable mass to be infiltrated. Second, a permeable mass that is successfully fully infiltrated would have to be maintained at some elevated temperature for a period of time to allow the distribution of constituents of the infiltrant phase to equilibrate. For large components, such "annealing times" could be so long as to be impractical.

While it is certainly possible to infiltrate masses containing larger amounts of carbon, what is preferred in this invention is a permeable mass containing less than about 25 percent by weight carbon, and more preferably less than about 10 percent. For many of the products contemplated by the present invention, a representative selection of which are shown in some of the Examples, a particularly preferred range is about 1 percent to about 5 percent.

The balance of the permeable mass may comprise one or more materials that are substantially inert under the process conditions, e.g., "filler materials". Candidate filler materials for use in the present invention would include the carbides such as SiC, $B_4C$, TiC and WC; the nitrides such as $Si_3N_4$, TiN and AlN; the borides such as $SiB_4$, $TiB_2$, and $AlB_2$; and oxides such as $Al_2O_3$ and MgO. The form of the filler material may be any that can be produced, for example, particulate, fiber, platelet, flake, hollow spheres, etc. The filler material bodies may range in size from submicron to several millimeters, with sizes ranging from several microns to tens of microns being common. Filler material bodies having different sizes may be blended together, for example, to increase particle packing.

The inventors appreciate that many of the above-mentioned materials are not intrinsically infiltratable by silicon-containing melts under reasonable infiltration conditions. Thus, some of these materials might be candidates as bedding materials, to be described in more detail later. However, by applying a coating material that is wettable and/or reactive with the silicon-containing infiltrant material, for example, carbon, at least some degree of infiltration can be achieved.

Permeable masses comprising one or more filler materials may range appreciably in terms of their packing or theoretical density. For example, a permeable mass comprising flakes or a reticulated structure may be only 5 to 10 percent dense. At the other extreme, a sintered preform may be 90 to 95 percent dense. As long as the preform is capable of being wetted by the infiltrant material and contains interconnected porosity, it should be capable of being infiltrated to form the composite bodies of the present invention.

The form of the carbon component, on the other hand, is significant, especially when attempting to infiltrate filler materials that are normally difficult to infiltrate, e.g., the oxides. While carbon in particulate form may be satisfactory for infiltrating a mass of silicon carbide, other fillers may necessitate that the carbon be reticulated or forming a network or skeletal structure. Especially preferred is carbon in the form of a coating on the filler material bodies. Such a form of carbon can be achieved by introducing the carbon into the permeable mass in liquid form, as for example, a resin. The permeable mass containing such a carbonaceous resin is then thermally processed to decompose or pyrolyze the resin to solid carbon, which may be graphite, amorphous carbon or some combination thereof. A number of carbonaceous resins are available including epoxy resins, phenolic resins and furfuryl alcohol. Preferred however, are sugar-based resins. These resins can be water-based and as such, are much more "friendly" in terms of environmental and human health. Particularly preferred are aqueous resins made from fructose.

In addition to assisting in the infiltration process, another important role played by the carbonaceous resin is that of a binder. Although one can infiltrate a loose mass of filler material, the more preferred route, especially where the goal is to make an article of some particular and desired shape, is to use a self-supporting preform. Typically, a loose mass of filler material is mixed with a binder, preferably here a carbonaceous binder, and then pressed or cast or molded to a desired shape using techniques known in the art. Curing the binder then renders the formed body self-supporting.

In another embodiment, careful observation of the differences in infiltratability of various permeable masses has enabled these differences to be exploited to advantage. Specifically, those materials that are substantially non-infiltratable under the process conditions can be used as bedding materials for supporting the permeable mass to be infiltrated. This result is significant because the bedding materials are usually significantly cheaper than graphite molds or "boats".

Through careful observation and experiment, the present inventors have noted the general conditions (or trends in changing conditions) whereby infiltration tends to occur or is enhanced, and those conditions under which infiltration tends not to occur, or tends to be inhibited. For example, the inventors have observed that reactive infiltration of an infiltrant comprising silicon into a permeable mass comprising carbon occurs more robustly when the carbon is present in elemental form rather than chemically combined with other elements. Furthermore, the infiltration is more robust when the elemental carbon is present in three-dimensionally interconnected form, as opposed to discrete particle form. When the permeable mass comprises a component other than elemental carbon, for example, aluminum nitride, the three-dimensionally interconnected elemental carbon phase could be present as, for example, a coating on at least some of the aluminum nitride bodies. Moreover, the infiltration is more robust when the temperature of infiltration is increased, both in terms of absolute temperature as well as in terms of the homologous temperature (e.g., percentage or fraction of the melting temperature). Still further, infiltration is more robust when conducted under vacuum as opposed to inert gas atmosphere such as argon.

Accordingly, with these parameters in mind, it is possible to design an infiltration setup whereby a first permeable mass to be infiltrated is supported by a permeable mass which differs in at least one respect with regard to that which is to be infiltrated, and the liquid infiltrant can be caused to infiltrate the first mass but not the supporting mass.

It is well known that a permeable mass comprising silicon carbide, for example, is infiltratable by silicon melts to produce a composite body. In the absence of free carbon, however, silicon carbide is reliably infiltrated by silicon (e.g., "siliconizing") only at temperatures well above the melting point of silicon. At temperatures just slightly above the silicon melting point, infiltration becomes rather difficult. If a metal like aluminum is alloyed with the silicon, the melting point or liquidus temperature is depressed, and the processing temperature similarly can be decreased, which further reduces the propensity for infiltration. Under these conditions, such silicon carbide material can be used as a bedding or barrier material. One desirable aspect of using silicon carbide as a bedding material is that in situations where impurities or contamination is an issue (e.g., semiconductor applications), the same source of silicon carbide can be used as a bedding material as is used as a permeable mass to be infiltrated without exposing the resulting silicon carbide composite body to alien or additional contaminants.

Conversely, under the same infiltration conditions as described immediately above, a silicon-containing alloy may infiltrate a silicon carbide mass containing free carbon at the relatively low processing temperatures, particularly if the elemental carbon is three-dimensionally interconnected in a reticulated structure. Such a structure may result when carbon is added to a permeable mass as a resin and the resin is subsequently pyrolyzed. Thus, it is possible to support a permeable mass comprising silicon carbide plus elemental carbon on a bedding of silicon carbide particulate not containing such free carbon, and infiltrate only the permeable mass with silicon-containing infiltrant material. Further, because a silicon-aluminum alloy is capable of discriminating between permeable masses containing free carbon in discrete versus interconnected form, conditions may be found whereby such an alloy can infiltrate the mass containing the reticulated carbon, but not the mass containing discrete particles of free carbon.

This result is significant because it dispenses with the need for graphite structures such as molds or "boats" to directly support the infiltrant material or the preform or permeable mass to be infiltrated. Not only are such large graphite structures expensive, but also the silicon-containing infiltrant has a tendency to react with and bond to the graphite, making separation and recovery of the infiltrated body difficult. The graphite boats in particular are frequently damaged or even destroyed. Additionally, such separation and recovery efforts often result in damage to the composite body, which can be relatively brittle without the toughening effects of a metal phase. While it is possible to apply a protective coating of, for example, boron nitride to the graphite boat or to the preform surface in contact therewith to prevent or minimize the bonding effect, some end uses for the formed body, such as certain semiconductor applications, cannot tolerate the potential for the presence of boron. Moreover, the boron nitride coatings are not robust infiltrant barriers, especially at the higher infiltration temperatures, and often a small breach in the coating allows the infiltrant to infiltrate and react with a large zone of the underlying graphite material. Thus, the present invention permits the graphite trays or boats to be used to support the bedding material, which in turn supports the permeable mass to be infiltrated and/or the infiltrant material. This advance in the art permits these graphite structures to be reused in subsequent infiltration runs, rather than having to be discarded as scrap.

It has been noted that silicon undergoes a net volume expansion of about 9 percent upon solidification. Thus, in accordance with another important aspect of the present invention, by alloying the silicon with a constituent such as a metal that undergoes a net volume shrinkage upon solidification, it is possible to produce a composite body whose residual infiltrant material within the composite body undergoes substantially no net volume change upon solidification. Thus, the production of silicon carbide composite bodies that exhibit neither solidification porosity nor solidification exuding of metal phase can be realized.

The particularly preferred alloying element of aluminum by itself exhibits a solidification shrinkage of some 6.6 percent by volume. Under the preferred conditions of a vacuum environment and a silicon carbide permeable mass containing interconnected free carbon, infiltration can be achieved using infiltrants ranging from about 10 percent by weight silicon up to substantially 100 percent silicon. Accordingly, the residual infiltrant component of the formed silicon carbide body may range from nearly 100 percent aluminum to substantially 100 percent silicon. Thus, the volumetric change of the residual infiltrant material upon solidification can be tailored with infinite variability between negative 6.6 percent (for pure aluminum) and positive 9 percent. Although it is advantageous to reduce solidification shrinkage, say for example to negative 2 or negative 1 percent, it is highly desirable and highly advantageous to reduce solidification swelling from positive 9 percent to perhaps positive 7, positive 5 or positive 3 percent, or less. Of course, from this perspective of infiltrant shrinkage/swelling upon solidification, zero change is best.

Of the two situations, solidification porosity may be the lesser concern. With thoughtful lay-up design and excess infiltrant material or a reservoir of infiltrant supplying the mass to be infiltrated, solidification porosity largely can be avoided if the last region to freeze in the composite body can be supplied with molten infiltrant material from outside the body. Sometimes directional solidification of the composite body is employed to accomplish this desired result.

The opposite problem actually is more frequently encountered where silicon infiltrations are concerned: where the infiltrant expands upon solidification, and the composite body cannot hold the extra volume of material. The composite body thus exudes the (now) excess infiltrant. The exuded silicon may manifest itself as droplets or beads on the surface of the composite body, and often strongly bonded thereto. This nuisance material may have to be removed by grinding or grit blasting, with the concomitant risk of damaging the attached composite body. Also, it would be desirable to not have to undertake this extra manufacturing step.

An even more serious consequence of the solidification swelling of the silicon constituent is possible swelling of the entire composite structure, thereby complicating efforts to produce net-shape parts. Still worse is the risk that such solidification swelling will cause cracking of the composite body, a risk which increases as the size of the composite body increases.

Thus, the ability to reduce or even eliminate this solidification expansion of the silicon constituent of the infiltrant material by alloying the silicon with a material that shrinks upon solidification represents an important advance in the field of silicon-containing composite materials. Not only may such composite bodies be made more dimensionally accurate in the as-infiltrated condition, but may be produced without requiring an extra process step to remove the exuded silicon. Additionally, larger bodies may now be produced with less risk of cracking due to expansion of the silicon phase within the composite during cooling through its solidification temperature.

The present invention will now be further described with reference to the following Examples and Comparative Examples.

EXAMPLE 1

This example demonstrates the production of a reaction bonded Si/SiC composite body. More specifically, this Example demonstrates the infiltration of substantially pure silicon into a silicon carbide preform containing an interconnected carbon phase derived from a resinous precursor.

First, a preform was prepared as follows. One hundred parts by weight of CRYSTOLON blocky (regular), green silicon carbide particulate (St. Gobain/Norton Industrial Ceramics, Worchester, Mass.) was combined with fifteen parts of Karo corn syrup (CPC International Inc., Englewood Cliffs, N.J.) by mixing. The silicon carbide particulate content consisted of about 70 percent having a median particle size of about 44 microns (Grade F 240), and the balance having a median particle size of about 13 microns (Grade F 500). The mixing was conducted in a Model RV02 Eirich high shear mixer as follows: First the SiC particulates were mixed for 2 minutes on the "low" speed. Then half the corn syrup was added and mixing continued on "low" for an additional 1 minute. Then mixing was interrupted to scrape the mixing bowl. Then the remaining half of the corn syrup was added and mixed for 1 minute on "low". After another interruption to scrape the bowl, mixing resumed on "low" for 2 additional minutes, then finished on the "high" speed for 1 minute.

The admixture was pushed through a 16 mesh screen (average opening size of about 1180 microns) to break up agglomerates.

Next, coupons measuring about 51 mm square by about 10 mm thick were uniaxially pressed in a steel die under an applied pressure of about 28 MPa.

The preform comprising the SiC particulate and the corn syrup was ejected from the die and placed into a controlled atmosphere furnace. In an atmosphere of flowing commercially pure nitrogen, the preform was heated to a temperature of about 800 C. at a rate of about 100 C. per hour. After maintaining this temperature for about 2 hours, the corn syrup had been substantially completely pyrolyzed to carbon. The furnace and its contents were cooled at a rate of about 200 C. per hour. After cooling back substantially to ambient temperature, the preform was recovered from the furnace and calculated (based upon bulk density measurements) as having a volumetric loading of about 61 percent of theoretical. Carbon analysis via oxidation, performed on a similar sample, showed the presence of about 2.5 percent by weight of free carbon in the preform.

Next, a lay-up to confine the infiltration process was prepared. Specifically, the interior surfaces of a Grade ATJ graphite boat (Union Carbide Corp., Carbon Products Div., Cleveland, Ohio) measuring about 375 mm by about 298 mm by about 51 mm deep was coated with a boron nitride slurry or paint at a rate or thickness of about 3.1 mg per square centimeter. The boron nitride paint was prepared by mixing four parts by weight of LUBRICOAT boron nitride paste (ZYP Coatings, Oak Ridge, Tenn.) with three parts water and spray coating using a Model 95 Binks spray gun.

The 46 gram preform was placed into the coated graphite boat. About 23 grams of silicon in lump form (Elkem Metals Co., Pittsburgh, Pa.) and comprising by weight about 0.5 percent Fe (max) and the balance Si, was placed on top of the preform. The top of the boat was covered with a loose-fitting (non-hermetic) BN coated graphite lid.

The completed lay-up was then placed into a vacuum furnace at about ambient temperature (e.g., about 20 C.). The air was evacuated using a mechanical roughing pump, and a rough vacuum of about 25 millitorr residual pressure was thereafter maintained. The lay-up was then heated from ambient temperature to a temperature of about 1350 C. at a rate of about 200 C. per hour. After maintaining a temperature of about 1350 C. for about 1 hour, the temperature was further increased to a temperature of about 1550 C. at a rate of about 200 C. per hour. After maintaining a temperature of about 1550 C. for about 1 hour, the temperature was decreased to a temperature of about 1450 C. at a rate of about 100 C. per hour. Without holding at this temperature, the lay-up temperature was further decreased to a temperature of about 1300 C. at a rate of about 25 C. per hour, which was immediately followed by a cooling at a rate of about 200 C. per hour to approximately ambient temperature.

The furnace atmosphere was brought back to ambient pressure and the lay-up was removed from the furnace. Disassembly of the lay-up revealed that silicon had fully infiltrated the preform to form a composite body comprising silicon carbide and silicon. After sandblasting off the residual silicon at the surface where infiltration commenced, a density of the composite body of about 2.89 g/cc was measured by the water immersion technique. Using the theoretical densities of SiC and Si, the body was calculated as being about 64 percent by volume of SiC and 36 percent Si.

EXAMPLE 2

The technique of Example 1 was repeated, with a major change being that the infiltrant featured aluminum substituted for about half of the mass of silicon. Thus, excluding impurities, the infiltrant was about 50 percent by weight silicon and about 50 percent aluminum. Also, in this Example the infiltration was conducted at a lower temperature than in Example 1.

The masses of the preform and infiltrant were slightly different from those of Example 1, at 44.8 grams and 20 grams, respectively. As for the differences in the heating schedule, the lay-up of the present Example was heated in vacuo from about ambient temperature to a temperature of about 1000 C. at a rate of about 200 C. per hour. After maintaining a temperature of about 1000 C. for about 1 hour, the temperature was further increased to a temperature of about 1150 C. at a rate of about 150 C. per hour. After maintaining a temperature of about 1150 C. for about 4 hours, the lay-up was cooled to near-ambient temperature at a rate of about 200 C. per hour.

Disassembly of the lay-up revealed that the infiltrant had again fully infiltrated the preform to form a composite body. Significantly, there was no excess infiltrant oozing out of the surface of the formed body. The density of the composite body was again about 2.89 g/cc.

EXAMPLE 3

This example demonstrates the effect of infiltrant chemistry on some selected physical properties of a silicon carbide composite body.

Two identical preforms were made using the materials and procedures similar to those detailed in Example 1. Following pyrolysis, each preform comprised by volume about 70 percent SiC and by weight about 3 percent elemental carbon.

One of the preforms, Sample A, was infiltrated according to the infiltrant composition and thermal processing schedule detailed in Example 1. The other preform, Sample B, was infiltrated according to the infiltrant composition and thermal processing schedule described in Example 2. Thus, Sample A was infiltrated with nominally pure silicon, and Sample B was infiltrated with nominally Si-50Al alloy. Following infiltration, the resulting SiC composite bodies were characterized. Selected properties are provided in Table I.

TABLE I

| Property | Test | Sample A | Sample B |
| --- | --- | --- | --- |
| SiC content (vol. %) | QIA | 73 +/− 3 | 76 +/− 2 |
| Density (g/cc) | Water Immersion | 2.97 | 3.01 |
| Young's Modulus (GPa) | Ultrasonic Pulse Echo | 347 | 302 |
| Poisson's Ratio | Ultrasonic Pulse Echo | 0.18 | 0.20 |
| Flexural Strength (MPa) | Four-Point Bend | 272 +/− 13 | 305 +/− 10 |
| Fracture Tough. (MPa-m$^{1/2}$) | Chevron Notch | 3.7 +/− 0.3 | 7.0 +/− 0.5 |
| CTE, 20–100 C (ppm/K) | TMA | 2.9 | 4.8 |
| Thermal Conduct. (W/m-K) | Photo Flash | 180 | 218 |

EXAMPLE 4

This example demonstrates the fabrication of a silicon carbide composite "U channel" featuring a multi-constituent infiltrant phase.

Preforms were prepared by a sedimentation casting process. Specifically, about 25 parts of liquid were added to 100 parts of CRYSTOLON blocky (regular), green silicon carbide (St. Gobain/Norton Industrial Ceramics, Worchester, Mass.) and 8 to 12 parts of KRYSTAR 300 crystalline fructose (A.E. Staley Manufacturing Co., Decatur, Ill.) to make a slurry. The silicon carbide particulate consisted of about 70 parts by weight of Grade F 240 (median particle size of about 44 microns) and the balance Grade F 500

(median particle size of about 13 microns). The solids and liquids were added to a plastic jar and roll mixed for about 40 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant consisting of a 10 weight percent aqueous solution of JOY dishwashing detergent (Proctor and Gamble, Cincinnati, Ohio). The wetted rubber mold was then placed onto the graphite plate and allowed to dry. The slurry was poured into the cavity. Vibration was commenced.

After the particulates had fully settled (about 3 hours), vibration was halted. The residual liquid on the top of the casting was blotted up with a sponge. The graphite plate and the castings in the rubber mold thereon were transferred from the vibration table to a freezer maintained at a temperature of about −15 C. The casting was thoroughly frozen in 6 hours time.

From the freezer, the frozen casting was demolded and placed onto a graphite setter tray for drying and bisque firing. The graphite tray and preform were then placed into a nitrogen atmosphere furnace at ambient temperature. The furnace was energized and programmed to heat to a temperature of about 40 C. over a period of about one-half hour, to hold at about 40 C. for about 2 hours, then to heat to a temperature of about 650 C. over a period of about 5 hours, to hold at about 650 C. for about 2 hours, then to cool down to about ambient temperature over a period of about 5 hours. The bisque fired preform was removed from the furnace and stored until the infiltration step. This firing operation pyrolyzes the fructose, yielding a well bonded preform containing about 2 to 3 percent by weight carbon.

The above-mentioned steps were employed to produce a "beam" preform and a "U-channel" preform. The U-channel preform had a mass of about 182 g and had overall dimensions of about 76 mm long by about 64 mm wide by about 38 mm high. This preform consisted of a flat base and two flat walls parallel to one another and at right angles with respect to the base. The base and walls were each about 10 mm thick. The beam preform was in the shape of a rectangular prism and measured about 89 mm long by about 11 mm wide by about 3 mm thick. During infiltration, this beam preform would serve as a conduit for conducting molten infiltrant toward and into the U-channel preform.

A lay-up for infiltration was then prepared.

Figure 1B:
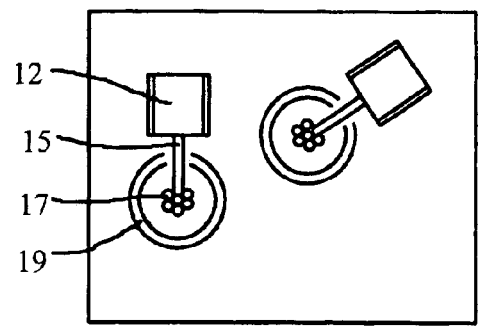

Referring to FIGS. 1A and 1B, CRYSTOLON blocky, green silicon carbide particulate 11 having a median particle size of about 216 microns (Grade F 90, St. Gobain/Norton Industrial Ceramics, Worchester, Mass.) was poured into a graphite tray 13 measuring about 400 mm square by about 50 mm in height. This silicon carbide particulate bedding material was arranged within the graphite tray so as to be slightly higher in elevation out towards the wall of the tray than towards the center of the tray.

The U-channel preform (and specifically the base portion thereof) was placed into contact with the beam. More specifically, the U-channel preform was cemented to one end of the beam preform with a slurry comprising by weight about 67 percent CRYSTOLON regular green silicon carbide particulate (Grade F 500, St. Gobain/Norton Industrial Ceramics) having a median particle size of about 13 microns, and the balance being about equal weight fractions of water and KRYSTAR 300 fructose (A.E. Staley Manufacturing Co.). Following the pyrolysis cycle to carbonize the fructose, the bonded preforms were placed onto the SiC particulate bedding material with the U-channel preform 12 at the higher elevation, and the opposite end of the beam preform 15 extending down towards the lower elevations.

A number of fragments 17 of an infiltrant material comprising by weight about 68 percent silicon, balance substantially pure aluminum and having a total mass of about 62 g were arranged at the foot of the beam preform, at the lower elevation. Additional Grade F 90 SiC particulate was arranged in a ring 19 around the pile of infiltrant material 17 to help confine the latter once it was made molten. The graphite tray and its contents were then placed into a larger graphite container (e.g., a "boat") having a non-hermetically sealing graphite lid, thereby completing the lay-up.

The lay-up was placed into a vacuum furnace. The heating chamber was evacuated to a pressure below 100 millitorr with a mechanical roughing pump. The chamber and its contents were then heated from a temperature of about 40° C. to about 1100° C. over a period of about 5 hours, then held at about 1100° C. for about 1 hour, then heated to about 1270° C. in about 1 hour, then held at about 1270° C. for about 4 hours, then cooled to about 40° C. in about 6 hours.

Following this heating schedule, the boat and its contents was recovered from the vacuum furnace. The silicon-aluminum alloy had melted, infiltrated through the beam preform and into the U-channel preform to form a dense, silicon carbide composite body. Although the beam was bonded to the U-channel and had to be removed by cutting with a diamond saw, the infiltration of alloy into the preforms was well controlled. Specifically, there was no infiltration into the SiC particulate bedding material, nor was there exuding of excess alloy (as droplets or otherwise) from the surfaces of the infiltrated preforms.

EXAMPLE 5

This example demonstrates the fabrication of a silicon carbide composite air bearing support frame featuring a multi-constituent infiltrant phase. This example also demonstrates the fabrication of a relatively large composite body.

An air bearing support frame preform was fabricated in two longitudinal sections using substantially the same sediment casting slurry as was described in Example 4. Following sedimentation casting and freezing, the preform halves were dried to a temperature of about 150C., with a carefully controlled heating up to this temperature to avoid cracking the parts due to the potential for excessive water vapor generation. The preform halves were then additionally thermally processed in a nitrogen atmosphere substantially in accordance with the heating described in Example 4 to pyrolyze the fructose binder to carbon. The preforms could then be green machined.

After the green machining operation, the sections were cemented together with a slurry comprising by weight about 67 percent CRYSTOLON regular green silicon carbide particulate (Grade F 500, St. Gobain/Norton Industrial Ceramics) having a median particle size of about 13 microns, and the balance being about equal weight fractions of water and KRYSTAR 300 crystalline fructose (A.E. Staley Manufacturing Co.). This slurry was roll mixed for about 4 hours, then de-aired. The mating surfaces of the preform were spray coated with KRYLON lacquer (Borden, Inc., Columbus, Ohio) to retard the water absorption somewhat during the gluing operation. The slurry was applied to one of the surfaces and the halves of the preform were brought together under light pressure. The bonded preform was then put back into the 150C. drying oven to cure the fructose in the joint region. Following a small amount of additional green machining at the bond line, the air bearing preform had approximate dimensions of about 511 mm long by about 35 mm wide by about 70 mm in height, and had a mass of about 2145 g.

A lay-up was next prepared. Specifically, CRYSTOLON regular, green silicon carbide particulate (Grade F 90, St. Gobain/Norton Industrial Ceramics) having a median particle size of about 216 microns was poured into a graphite tray measuring about 790 mm long by about 230 mm wide by about 50 mm deep and leveled to form a bedding material. The air bearing preform was placed on the bedding material. About 836 g of an infiltrant alloy comprising by weight about 68 percent silicon, balance substantially pure aluminum was placed nearby. The graphite tray was then placed into a larger graphite vessel having a non-hermetically sealing graphite lid to complete the lay-up.

This lay-up, which measured about 850 mm long by about 290 mm wide by about 240 mm high, was then placed into a vacuum furnace and thermally processed in substantially the same manner as that for Example 4, except that the temperature was maintained at about 1270C. for about 6 hours instead of about 4 hours.

After removing the lay-up from the vacuum furnace following thermal processing, it was observed that the alloy infiltrant had melted, flowed across (but not into) the silicon carbide particulate bedding material into contact with the air bearing preform, and had infiltrated the preform to produce a silicon carbide composite air bearing support frame. While there was a body of residual alloy material bonded to the air bearing at the initial contact point, the other surfaces of the support frame accurately reflected the original preform surfaces, with no infiltrant material exuding from or otherwise accumulating on a surface.

EXAMPLE 6

An air bearing support frame measuring about 120 mm square and about 19 mm in height was fabricated substantially along the lines described in Example 5 except that bonding of the two pieces was not carried out until after each piece had been infiltrated with silicon-aluminum alloy to form a reaction bonded silicon carbide composite part.

Figure 2:
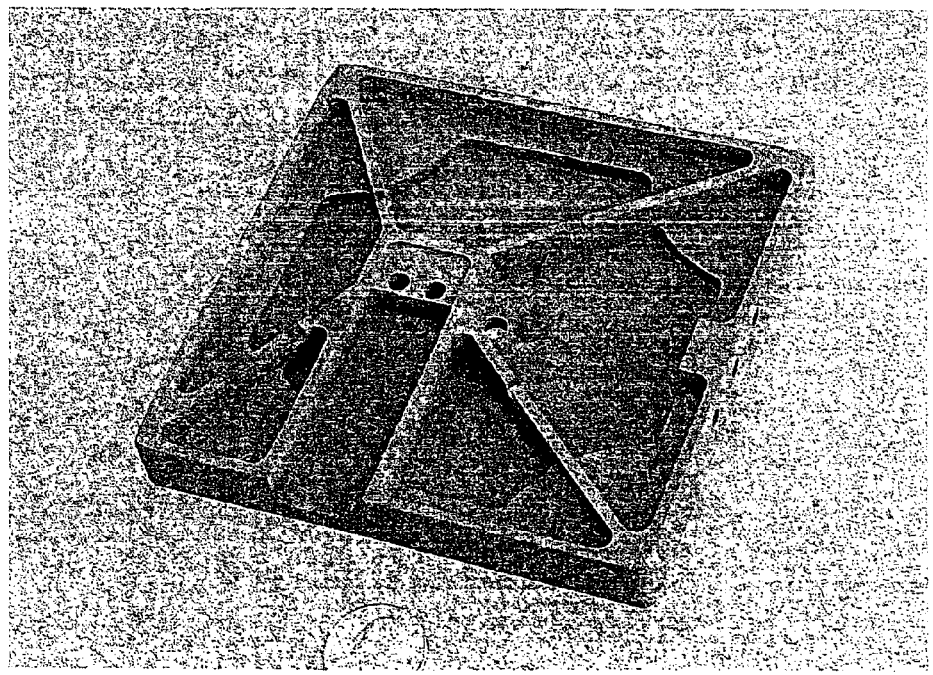
FIG. 2 is a photograph of a silicon carbide composite air bearing support frame produced in accordance with Example 6.

FIG. 2 shows the more complex-shaped piece of the two in the as-infiltrated condition.

Examples 4 through 6 thus demonstrate that a shaped silicon carbide composite part, even one having a complex geometry, can be produced by the present reactive infiltration technique with the final composite body accurately replicating the shape and surfaces of the starting preform.

COMPARATIVE EXAMPLE 1

The materials and techniques of Example 2 were substantially repeated, except that instead of adding corn syrup and pressing a preform, the permeable mass consisted only of a loose mass of the silicon carbide particulates. While the Si-50Al alloy melted and covered the surface of the silicon carbide particulate, no infiltration occurred.

COMPARATIVE EXAMPLE 2

Example 2 was substantially repeated, except that instead of adding about 15 percent by weight of corn syrup to the silicon carbide particulate filler material, about 1 percent by weight of ELVACITE acrylic resin (The DuPont Co., Wilmington, Del.) was added. About 99.1 percent of the resin was removed during the preform heating step prior to the infiltration step. Again, no infiltration occurred.

COMPARATIVE EXAMPLE 3

Example 2 was substantially repeated, except that instead of adding 15 percent by weight of corn syrup to the silicon carbide particulate and pressing a preform, about 3 percent by weight of Grade KS-6 graphite powder (Lonza, Inc., Fairlawn, N.J.) was mixed into the particulates. While infiltration might have resulted at higher temperatures, no infiltration of Si-50Al alloy into a loose mass of this admixture occurred at the present operating temperature of about 1150C.

COMPARATIVE EXAMPLE 4

Example 1 was substantially repeated, except that instead of a vacuum environment, an atmosphere of commercially pure, flowing argon gas was used. No infiltration occurred.

COMPARATIVE EXAMPLE 5

Example 2 was substantially repeated, except that instead of a vacuum environment, an atmosphere of commercially pure, flowing argon gas was used. Some regions of the preform were not infiltrated with alloy material. Moreover, those regions that were infiltrated were porous and non-uniform.

INDUSTRIAL APPLICABILITY

The methods and compositions of the present invention find utility in applications requiring high specific stiffness, low thermal expansion coefficient, high hardness, high thermal conductivity and/or high wear resistance. Accordingly, the silicon carbide composite materials of the present invention are of interest in the precision equipment, robotics, tooling, armor, electronic packaging and thermal management, and semiconductor fabrication industries, among others. The present silicon carbide composite materials are candidate materials for wear critical components. Specific articles of manufacture contemplated by the present invention include semiconductor wafer handling devices, vacuum chucks, electrostatic chucks, air bearing housings or support frames, electronic packages and substrates, machine tool bridges and bases, mirror substrates, mirror stages and flat panel display setters.

An artisan of ordinary skill will readily appreciate that various modifications may be made to the present invention without departing from the scope of the claims, as defined herein.

What is claimed is:

1. An article of manufacture selected from the group consisting of an air bearing support frame, a mirror substrate, a semiconductor wafer chuck, a machine tool bridge, a machine tool base and a flat panel display setter, said article comprising:
    a composite material comprising a silicon carbide component and a metal component distributed throughout said silicon carbide, said metal component comprising at least about 40 percent by weight of silicon and from about 40 to about 60 percent by volume of aluminum.
2. The article of claim 1, wherein said metal component comprises not less than about 50 percent by weight of said silicon.
3. The article of claim 1, wherein said metal component undergoes a volumetric size change upon solidification from the molten state in the range of about negative 1 percent to about positive 3 percent.

4. The article of claim 1, wherein said silicon carbide component is at least partially interconnected.

5. The article of claim 1, further comprising at least one filler material distributed throughout said silicon carbide component.

6. The article of claim 5, wherein said at least one filler material comprises a substance selected from the group consisting of $B_4C$, TiC, WC, $Si_3N_4$, TiN, AlN, $SiB_4$, $TiB_2$ and $AlB_2$.

7. The article of claim 5, wherein said at least one filler material comprises silicon carbide.

8. The article of claim 5, wherein said at least one filler material comprises a form selected from the group consisting of particulate, fiber, platelet and flake.

9. The article of claim 5, wherein said at least one filler material makes up at least about 10 percent by volume of said composite material.

10. The article of claim 5, wherein said at least one filler material makes up at least 59 percent by volume of said composite material.

11. The article of claim 5, wherein said at least one filler material comprises bodies having a size in a range of about 1 micron to about 1 millimeter.

12. The article of claim 1, made by a reaction-bonding process.

13. The article of claim 12, wherein said reaction-bonding process comprises (a) in an inert environment, contacting a molten infiltrant comprising silicon and at least one other metal to a permeable mass comprising at least one filler material and not more than about 10 percent by weight of carbon, and (b) infiltrating said molten infiltrant into said permeable mass, and reacting said silicon of said molten infiltrant with at least a portion of said carbon to produce at least some silicon carbide in-situ.

14. The article of claim 13, wherein said filler material comprises at least one substance other than silicon carbide.

15. The article of claim 13, wherein said in-situ silicon carbide amounts to at least about 5 percent by volume of said composite material.

16. The article of claim 12, wherein said reaction bonding process produces at least some in-situ silicon carbide.

17. The article of claim 16, wherein said in-situ silicon carbide makes up no more than about 24 percent by volume of said composite material.

18. An article of manufacture selected from the group consisting of an electronic package and an electronic substrate, said article comprising:

a composite material comprising (a) a matrix component comprising silicon carbide, (b) at least about 59 percent by volume of at least one filler material; and (c) a metal component comprising at least about 40 percent by weight of silicon and from about 40 to about 60 percent by volume of aluminum, said at least one filler material and said metal component distributed throughout said matrix component.

19. The article of claim 18, wherein said at least one filler material comprises a substance selected from the group consisting of carbides, borides, nitrides and oxides.

20. The article of claim 18, wherein said filler material comprises silicon carbide.

21. The article of claim 18, wherein said metal component is characterized by a volume change upon solidification of between about negative 5 percent and about positive 7 percent.

22. The article of claim 18, wherein said metal component is characterized by a volume change upon solidification of between about negative 2 percent and about positive 4 percent.

* * * * *